C. SCHÜTZ.
CAR TRUCK.
APPLICATION FILED JUNE 18, 1912. RENEWED JULY 14, 1914.

1,128,533.

Patented Feb. 16, 1915.

2 SHEETS—SHEET 1.

WITNESSES:
R. Schleicher
Jos. J. Denny

INVENTOR
Conrad Schütz,
BY
Charles N. Butler
ATTORNEY.

C. SCHÜTZ.
CAR TRUCK.
APPLICATION FILED JUNE 18, 1912. RENEWED JULY 14, 1914.
1,128,533.
Patented Feb. 16, 1915.
2 SHEETS—SHEET 2.
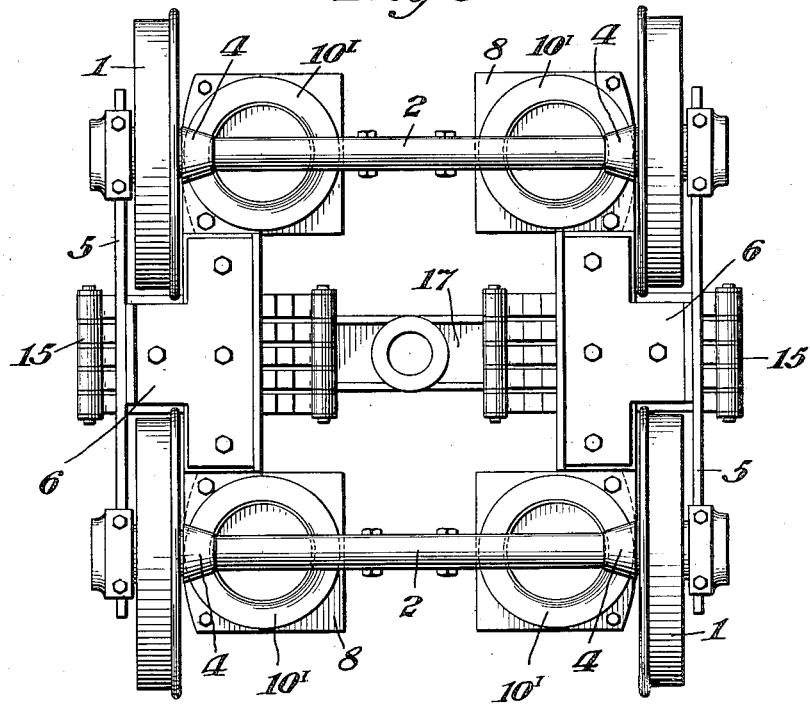
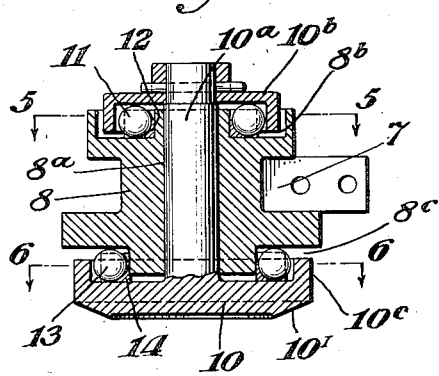
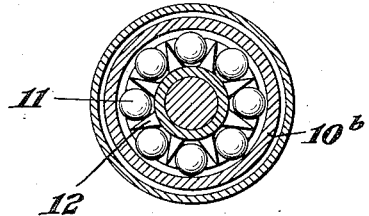
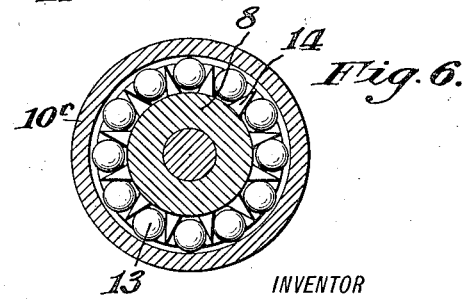
WITNESSES:
R. Schleicher
Jos. J. Wennys
INVENTOR
Conrad Schütz,
BY
Charles N. Butler
ATTORNEY.

UNITED STATES PATENT OFFICE.

CONRAD SCHÜTZ, OF PHILADELPHIA, PENNSYLVANIA.

CAR-TRUCK.

1,128,533.

Specification of Letters Patent.

Patented Feb. 16, 1915.

Application filed June 18, 1912, Serial No. 704,282. Renewed July 14, 1914. Serial No. 850,996.

*To all whom it may concern:*

Be it known that I, CONRAD SCHÜTZ, a citizen of the United States, residing in the city of Philadelphia, county of Philadelphia, and State of Pennsylvania, have invented certain Improvements in Car-Trucks, of which the following is a specification.

My invention is a car truck having improved means for carrying the load to the traction wheels and its primary object is to provide an improved frame and antifriction bearing mechanism for carrying the load to such wheels.

Figure 1:
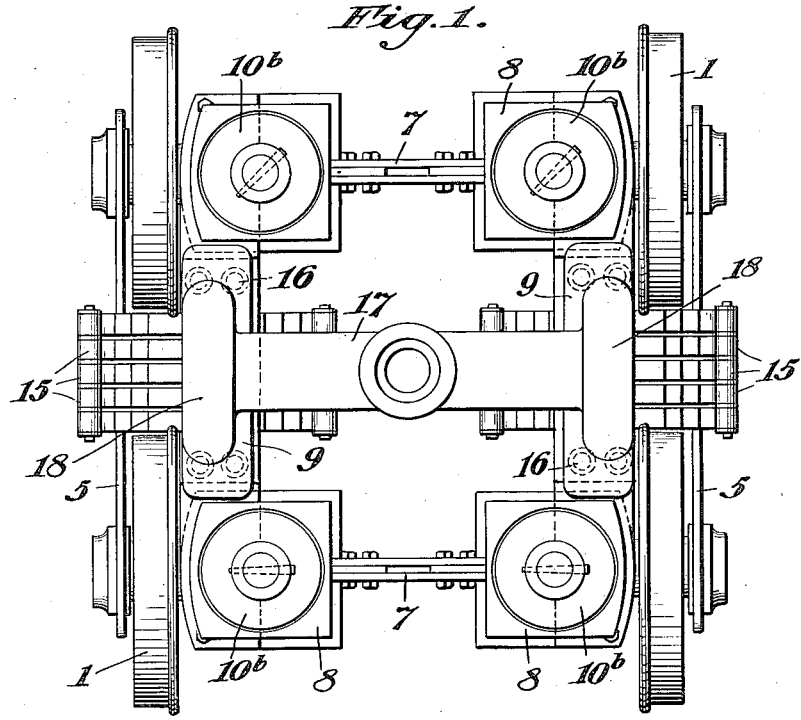
Figure 2:
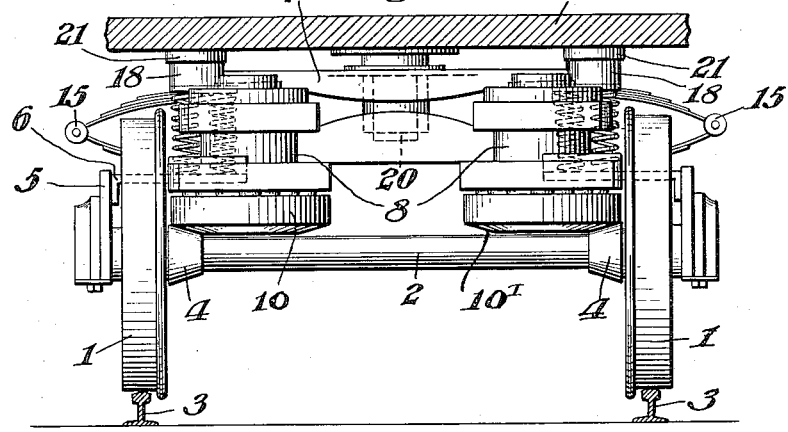

In the accompanying drawings, Figure 1 is a top plan view of a truck embodying my improvements; Fig. 2 is an end elevation of the same with a cross sill supported thereon; Fig. 3 is a plan view of the bottom of the truck; Fig. 4 is a vertical sectional view taken through the axis of one of the antifriction bearings; Fig. 5 is a sectional view taken on the line 5—5 of Fig. 4, and Fig. 6 is a sectional view taken on the line 6—6 of Fig. 4.

The truck, as illustrated in the drawings, comprises the usual car wheels 1 fixed on the axles 2 and adapted to move on rails 3, the axles being provided with conical bearings 4 fixed with their bases in juxtaposition to the inner faces of the wheels so as to converge therefrom.

The frame comprises the longitudinal beams 5 which connect the outer ends of the axles 2, the brackets 6 fixed to the beams 5, the tranverse beams 7 to the ends of which are fixed the bearings 8, and the longitudinal beams 9 having their ends fixed to the bearings 8 and their median portions fixed to the brackets 6 which provide bearings therefor.

The bearings 8 are provided with vertical cylindrical passages 8ª, top races 8ᵇ and bottom races 8ᶜ. Disks or wheels 10 have spindles 10ª which extend upwardly through corresponding passages 8ª of bearings 8, cups 10ᵇ which are secured to the tops of the spindles 10ª in registration with the races 8ᵇ, and races 10ᶜ registering with races 8ᶜ. Balls 11 are spaced in the races 8ᵇ by cage rings 12 and lie within the downward projecting flanges of the cups 10ᵇ which are supported thereby. Balls 13 are spaced in the races 8ᶜ by cage rings 14 which are supported by the upper faces of the wheels 10 and lie within the races 10ᶜ, whereby antifriction bearings are provided between the bearings 8 and wheels 10.

The wheels 10 are provided with beveled or conical annular surfaces 10′ which conform with and run upon the respective cones 4, whereby the truck frame is supported.

The beams 9 support elliptical springs 15 and coiled springs 16 which carry a bolster beam 17 through its end plates or bearings 18 which rest upon these springs. A cross sill 19 is provided with the pin 20 which is journaled in the bolster beam 17 and with the side bearings 21 movably engaging the end plates 18.

While the foregoing apparatus is particularly designed for railway trucks, it will be understood that the construction is applicable to other constructions, such as motor vehicles, particularly traction trucks for street use.

It will be understood that the foregoing apparatus eliminates the usual bearings whereby the load is carried to the axle through boxes and brasses with which said axles make rubbing, frictional contact, with the well known attending disadvantages. The avoidance of wear and consequent play, which result from the usual frictional connection of the bearings with the axles, has a marked advantage in the application of the brakes to the wheels, due to the fact that the wheels cannot move away from the brake shoes.

Having described my invention, I claim:

1. A car truck comprising an axle, and traction wheels and conical bearings on said axle, in combination with a frame having bearings with journals therein, wheels having beveled faces engaging said conical bearings and spindles disposed in said journals, antifriction mechanism disposed between said last named wheels and bearings, caps on said spindles, and antifriction mechanism disposed between said caps and bearings.

2. A car truck comprising an axle, and traction wheels and conical bearings on said axle, in combination with a frame having bearings with journals therein, revoluble spindles in said journals, antifriction mechanism supporting said spindles, and wheels fixed to said spindles and having faces engaging the conical bearings on said axle.

3. A car truck comprising an axle, traction wheels thereon, and conical bearings fixed to said axle, in combination with a frame and mechanism comprising wheels having conical surfaces engaging said bearings whereby the load is transmitted to said traction wheels.

In witness whereof I have hereunto set my name this 14th day of June 1912, in the presence of the subscribing witnesses.

CONRAD SCHÜTZ.

Witnesses:
C. N. BUTLER,
JOS. G. DENNY, Jr.